Patent Number: 4,471,106
Date of Patent: Sep. 11, 1984

United States Patent [19]
Luecke et al.

[54] PHENOL-MODIFIED HYDROCARBON RESINS WITH A HIGH OH-NUMBER, METHOD FOR THE PREPARATION THEREOF

[75] Inventors: Wolfgang Luecke, Oberhausen; Herbert Beneke, Castrop-Rauxel; Peter Staeglich; Manfred Muehlenkamp, both of Duisburg, all of Fed. Rep. of Germany

[73] Assignee: Rutgerswerke Aktiengesellschaft, Frankfurt, Fed. Rep. of Germany

[21] Appl. No.: 548,908

[22] Filed: Nov. 4, 1983

[30] Foreign Application Priority Data

Nov. 19, 1982 [DE] Fed. Rep. of Germany ....... 3242782

[51] Int. Cl.$^3$ ...................... C08G 65/40; C08G 83/00
[52] U.S. Cl. .................................. 528/205; 525/534; 528/59; 528/60; 528/65; 528/75; 528/85
[58] Field of Search ................ 528/205, 60, 59, 65, 528/75, 85; 525/534

[56] References Cited

U.S. PATENT DOCUMENTS

| | | | |
|---|---|---|---|
| 3,420,915 | 1/1969 | Braithwaite, Jr. | 528/205 |
| 4,032,486 | 6/1977 | Gobran | 528/205 |
| 4,307,223 | 12/1981 | Shintani et al. | 525/534 |
| 4,357,459 | 11/1982 | Runavot et al. | 528/205 |
| 4,360,628 | 11/1982 | Runavot et al. | 528/205 |
| 4,403,088 | 9/1983 | Smith et al. | 528/205 |

OTHER PUBLICATIONS

The Preparation of Polyisobutenes and Polystyrenes with Phenol End Groups, Russell et al., European Polymer Journal, vol. 15, pp. 969–974 (1979).

*Primary Examiner*—Lester L. Lee
*Attorney, Agent, or Firm*—Beveridge, DeGrandi & Kline

[57] ABSTRACT

Phenolic-modified hydrocarbon polymers with a high OH-number yet with excellent compatibility with non-polar solvents are suitable for preparing adhesives and coating materials. The polymers are obtained by isothermal, catalytic copolymerization of:
- 30–40% by weight phenolic compounds,
- 65–30% by weight aromatic, unsaturated hydrocarbons, and
- 5–30% by weight isobutene.

13 Claims, No Drawings

PHENOL-MODIFIED HYDROCARBON RESINS WITH A HIGH OH-NUMBER, METHOD FOR THE PREPARATION THEREOF

The invention relates to new phenol-modified hydrocarbon resins with a high OH-number and better compatibility with non-polar aliphatic solvents.

Synthetic hydrocarbon resins, which are preferably produced through polymerization of unsaturated aromatic hydrocarbons acquire through additional polar groups such as, e.g., OH-groups, better capabilities for adhering to different undercoats. Therefore, such hydrocarbon resins which have a high proportion of OH-groups, are much sought after in coating technology and in the adhesives industry.

Stable resins with an OH-number greater than 6 are described in West German Patent Application P 31 28 869.3, corresponding to U.S. application Ser. No. 399,092, now abandoned, the entire disclosure of which is incorporated herein and relied on. These resins are prepared through polymerization of unsaturated aromatic hydrocarbons in the presence of phenol or substituted phenols, during which an aliquot of the unsaturated aromatic hydrocarbons and/or the total amount of phenols and catalyst is applied and the polymerization is controlled in such a way, through addition of the residual unsaturated aromatic hydrocarbons, that it occurs isothermally after the selected polymerization temperature has been reached. The result of this process is that polymerizates have only a slight phenol odor in addition to a high proportion of phenol.

However, for the manufacture of adhesives, these resins are never processed alone, but always in combination and in formulations with other resins, elastomers and by using solvents of frequently different polarities. Thus, excellent solubility, preferably in alcohols and in non-polar aliphatic solvents, is desirable.

While the resins as described in West German Patent Application P 31 28 869.3 have excellent compatibility with the lower alcohols, they are, however, insoluble in aliphatic and cycloaliphatic solvents.

Therefore, stable hydrocarbon resins with an as high OH-number as possible and which are soluble both in conventional alcohols and in aromatic, as well as in aliphatic and cycloaliphatic solvents, have been much sought after. This object is achieved by preparing phenol-modified hydrocarbon polymers according to the invention by catalytic copolymerization of:

30–40% by weight phenolic compounds
65–30% by weight aromatic unsaturated hydrocarbons, and
5–30% by weight isobutene.

In carrying out the process of the invention, the catalytic copolymerization of phenol compounds and aromatic hydrocarbons with isobutene is accomplished by first mixing the phenolic compound with the catalyst and then a mixture of the aromatic unsaturated hydrocarbons and isobutene, cooled down to the temperature below the initial boiling point of the mixture thereof, is added accompanied by cooling and the polymerization reaction is carried out isothermally at a temperature at or below about 140° C. at normal pressure.

Alternatively, the phenolic compound and catalyst may be mixed at a temperature of from 10° to 50° C. and the aromatic unsaturated hydrocarbons and isobutene are fed in separate dosages so that the reaction temperature does not exceed 140° C. and the reaction is carried out at a pressure up to 4 bar. These resins can be used as components of adhesive compositions and in coating materials that harden in the presence of moisture.

The resins of the invention are light colored products with a softening point in the temperature range of 10°–15° C. They have only a slight odor, signifying that the phenolic compounds used are completely bonded.

The copolymerization with isobutene substantially improves the compatibility of the resins with non-polar solvents, so that the resins of the invention are soluble in all conventional solvents such as, e.g., n-pentane, n-hexane, cyclohexane, tetralin, decalin, toluene. However, a surprising find is that the polar properties are not impaired. Thus, excellent adhesive properties are achieved and there is good comptability with other polar resins. Likewise, the solubility in polar solvents is good.

Three different types of raw materials are capable of reaction: phenolic compounds, unsaturated aromatics, and isobutene.

Both mononuclear and multinuclear phenolic compounds, such as phenol itself, its alkyl-substituted homologs such as cresols or xylenols (e.g. lower alkyl-substituted phenols) and naphthols, as well as halogen-substituted phenols such as chloro-or bromophenol and multivalent phenols such as resorcinol or cathecol, can be used as phenolic compounds.

These phenolic compounds can be used both as single compounds and as mixtures in any composition.

On the one hand, polymerizable aromatic hydrocarbons are found in the distillates derived from high-temperature coal tar and boiling in the temperature range 140° to approximately 220° C. and, on the other hand, unsaturated aromatic hydrocarbons are produced during the cracking of naphtha or gas oil, as well as during the pyrolysis of cracking residues, and are enriched in a fraction (the so-called resin-oil fraction) which boils in the temperature range 160°–220° C. These fractions contain as unsaturated aromatic compounds essentially indene, vinyl toluene, methyl indene, benzofuran, dicyclopentadiene, methyldicyclopentadiene, styrene and α-methylstyrene in a 50–70% concentration, in addition to non-reactive aromatic compounds.

The quantity ratios of the reactants lie in the following ranges:

30–40% by weight, preferably 34% by weight, phenolic compounds, 65–30% by weight, preferably 46% by weight, unsaturated aromatic compounds.
5–30% by weight, preferably 20% by weight, isobutene.

The quantities of phenolic compounds used ensure an OH-number of at least 4 for the resultant resins. On the other hand, it is possible, by using multivalent phenols, to increase the OH-number up to, e.g. 9. A surprising finding was that the stable incorporation of the phenolic compounds is enhanced by the copolymerization with the aliphatic unsaturated compound, so that even the products with high proportions of phenol only have a slight phenol odor.

As a rule, these unsaturated aromatic compounds are polymerized by means of acids or Friedel-Crafts catalysts such as, e.g. trichloroacetic acid, boron trifluoride complexes, aluminum-, antimony V-, or zinc IV-chloride. These catalysts are known in the art. Any catalyst capable of catalyzing the reaction and not deleterious to the reaction may be used.

The reaction temperatures range from 20° to about 140° C. They are brought about by the critical temperature of the isobutene and by the pressure prevailing during the reaction.

If the polymerization temperature ranges from 40° to 140° C., polymers are obtained that are liquid at room temperature. A lower polymerization temperature produces resins with a softening point up to, e.g. 50° C. The exothermal polymerization reaction is conducted in such a way that, when the desired polymerization temperature is reached, the latter is held constant through metered addition of the unsaturated reactant and/or through cooling.

To carry out the polymerization, catalyst and phenol or a mixture of phenols are preferably placed as a solution in aromatic solvents and the unsaturated aromatic hydrocarbons and the isobutene are charged progressively in the fixed ratio. This can be done by mixing the unsaturated aromatic hydrocarbons and the isobutene in the cold state and maintaining them at a temperature below the initial boiling point and charging this mixture to the phenolic compounds in portions or continuously, accompanied by cooling, so that the polymerization occurs isothermally. Then, the reaction can be carried out at normal pressure and the polymerization temperatures range from 20° to about 140° C. However, it is also possible to mix the phenolic compounds and the catalyst at a temperature ranging from 10° to 50° C. and to add the aromatic unsaturated hydrocarbons and the isobutene separately in the fixed ratio without cooling. The gaseous isobutene is passed to the reaction vessel at a pressure of up to 4 bar. Depending on how fast the reactants are mixed together, reaction temperatures up to about 140° C. are obtained. Upon reaching the desired polymerization temperature, the reaction is controlled by cooling and/or dosing the addition of the reactants so that the polymerization occurs isothermally.

The polymers of the invention thus produced are practically odor-free products which are either liquid at room temperature or have softening points up to about 50° C. Owing to the high proportions of phenol and the resultant high OH-number, the compatibility with polar resins such as, e.g., epoxy resins, is excellent. Also, there is an almost unlimited miscibility with methanol, but also with other alcohols with a longer aliphatic chain such as, e.g., ethanol, isopropanol or butanol. Of special significance, however, is an additionally achieved compatibility with aliphatic and cycloaliphatic solvents such as, e.g., pentane, hexane, i-octane or cyclohexane.

The table below points out, with the aid of the turbidity point of 50% solutions of the resins the solubility of the resins in test gasoline with different isobutene contents of the resins:

| SOLUBILITY IN TEST GASOLINE (TURBIDITY POINT) OF A 50% SOLUTION OF RESIN OF THE INVENTION IN ACCORDANCE WITH THE ISOBUTENE CONTENT | | | | | |
|---|---|---|---|---|---|
| Isobutene content (%) | 0 | 5 | 10 | 15 | 20 |
| OH-number | 6.2 | 5.9 | 6.3 | 5.8 | 5.8 |
| Turbidity point | 50 | 27 | 12 | −7 | −31 |

These properties enable the polymers of the invention to be used without difficulties in a wide range of coating and adhesive formulations. Particularly advantageous are reaction adhesives with isocyanates in which the phenolic OH-groups react with the isocyanate groups. Any suitable conventional isocyanate may be used for this purpose. By selecting the proportions of OH-groups and isocyanate groups, these adhesives can be so adjusted that, after the addition of an accelerator, they are either fully cross-linked and cured or, if there is an excess of isocyanate, they only cross-link preliminarily and thus result in coating materials that are stable in storage and cure with atmospheric humidity during use. Conventional accelerators and/or cross-linking agents may be used as will be apparent to those skilled in the art.

The following examples serve to illustrate the detailed aspects of the invention.

EXAMPLE 1

In a reaction vessel which is provided with an agitator and is so thermo-regulated by heating and jacket-cooling that the isothermal reaction can occur at about 40° C., 3215 g of a 70% phenol solution is placed in toluene and reacted with:

65 ml BF$_3$.dimethylether. Then, for 1 to 1½ hour and and accompanied by continuous agitation, a liquid mixture of:

1090 g isobutene and 3000 g resin oil fraction (boiling range 160°–210° C.) is charged.

The mixture of isobutene and resin oil is cooled down to −3° C. as well as the pump head of the dosing pump. This prevents the isobutene from evaporating prematurely. After this mixture has been added, it is allowed to react subsequently, and the resultant hydrocarbon polymer is isolated in the conventional manner.

3500 g of a resin having a slight odor is obtained having a softening point of 18° C. (K-S) and a luminous intensity (Barrett) of B ¼. The OH-number of the resin is 5.9. The solubility of this resin in various solvents at room temperature is shown in the following table:

| | RESIN CONCENTRATION [%] | | | |
|---|---|---|---|---|
| Solvent | 50 | 33⅓ | 25 | 10 |
| n-pentane | clear | turbid | turbid | turbid |
| n-hexane | clear | clear | turbid | turbid |
| cyclohexane | clear | clear | clear | clear |
| toluene | clear | clear | clear | clear |
| tetralin | clear | clear | clear | clear |

EXAMPLE 2

Adhesive agent with delayed seeting time

| | Composition |
|---|---|
| (a) 100 parts by weight | resin according to Example 1 |
| (b) 5–10 parts by weight | diphenylmethane-4,4' diisocyanate (e.g., Desmodur VL) |
| (c) 100 parts by weight | of a higher-molecular polyurethane prepolymer with reactive isocyanate groups (e.g., Desmodur E 14) |
| (d) 150 parts by weight | mixture of solvents (e.g., consisting of equal amounts of gasoline 60/90 (ethyl acetate and toluene) |
| (e) 0.5 parts by weight | tertiary amine (e.g. Desmorapid PP) |

Components a–d are mixed without causing a reaction. Even heating does not lead to the start of a reaction.

The curing reaction is not triggered until mixture with accelerator (e).

By feeding small amounts of component (b), a soft adhesive is obtained and, by adding more of component (b), an increasingly harder adhesive is obtained.

It is to be understood that ingredients b, d, c and e above are conventional ingredients and that various substitions of other similar materials may be utilized without departing from the scope of the invention.

EXAMPLE 3

Coating material which hardens in the presence of moisture

| Composition | | |
|---|---|---|
| (a) 100 parts by weight = 28.5% | Resin according to Example 1 | |
| (b) 50 parts by weight = 14.3% | Diphenylmethane-4,4' diisocyanate (e.g., Desmodur VL) | |
| (c) 50 parts by weight = 14.3% | of a higher-molecular polyurethane prepolymer with reactive isocyanate groups (e.g., Desmodur E 14) | |
| (d) 150 parts by weight = 42.8% | Mixture of solvents (e.g., consisting of equal parts of gasoline 60/90, ethylacetate and toluene) | |
| (e) 0.5 parts by weight = 0.14% | tertiary amine (e.g., Desmorapid PP) | |

All the constituents are mixed. After adding accelerator (e), the OH-groups is pre-cross-linked with the isocyanate group. The isocyanate groups that are still free react with the air moisture during use after the cost has been applied.

It is to be understood that ingredients b, c, d and e above are conventional ingredients and that various substitutions of other similar materials may be utilized without departing from the scope of the invention.

Variations and modifications of the invention will be apparent to those skilled in the art after reading the foregoing and are intended to be encompassed by the claims appended hereto. The German priority application P 32 42 782.4 is relied on and incorporated by reference.

We claim:

1. Phenolic-modified hydrocarbon polymers with a high OH-number which are prepared through the catalytic copolymerization of:
   30–40% by weight phenolic compound
   54–30% by weight aromatic unsaturated hydrocarbon, and
   5–30% by weight isobutene
in the presence of a catalyst capable of catalyzing the copolymerization.

2. A phenolic-modified hydrocarbon polymer as claimed in claim 1, further characterized in that it is prepared by the copolymerization of 34% by weight of phenolic compound, 46% by weight of aromatic unsaturated hydrocarbon and 20% by weight isobutene.

3. A phenolic-modified hydrocarbon polymer as claimed in claim 1, wherein the phenolic compound is a mononuclear or multinuclear phenol.

4. A phenolic-modified hydrocarbon polymer as claimed in claim 3, wherein the phenolic compound is phenol, alkyl substituted phenol, naphthol, halogen substituted phenol, resorcinol, cathecol, or mixtures thereof.

5. A phenolic-modified hydrocarbon polymer as claimed in claim 1 wherein the aromatic unsaturated hydrocarbon is obtained from the distillate from high temperature coal tar boiling in the range of 140° to 220° C., or is an unsaturated aromatic hydrocarbon produced by cracking of naphtha or gas oil, or by the pyrolysis of cracking residues and are enriched in a fraction which boils in the temperature range of 160°–220° C., or mixtures thereof.

6. A method of preparing a phenolic-modified hydrocarbon polymer as claimed in claim 1, comprising mixing a phenolic compound with a catalyst capable of catalyzing the reaction, adding thereto a mixture comprising an aromatic unsaturated hydrocarbon and isobutene, which is cooled down to a temperature below the initial boiling point of said mixture, and carrying out a polymerization reaction isothermally at normal pressure and at a temperature at or below about 140° C.

7. The method of claim 6, wherein the said mixture is added in portions accompanied by cooling.

8. The method of claim 6, wherein the said mixture is added continuously with cooling.

9. A method of preparing a phenolic-modified hydrocarbon polymer as claimed in claim 1, comprising mixing a phenolic compound and a catalyst for the reaction at a temperature ranging from 10° to 50° C. and feeding an aromatic unsaturated hydrocarbon and isobutene in separate dosages so that the reaction temperature does not exceed about 140° C. and carrying out the reaction at a pressure up to 4 bar.

10. An adhesive composition containing a phenolic-modified aromatic hydrocarbon polymer as claimed in claim 1.

11. A coating composition that hardens in the presence of moisture, containing a phenolic-modified aromatic hydrocarbon polymer as claimed in claim 1, and at least one compound with an isocyanate group in which the number of isocyanate groups is greater than that of the phenolic OH-groups.

12. The method of claim 6 further comprising using a Friedel-Crafts catalyst for the reaction.

13. A phenolic-modified hydrocarbon polymer as claimed in claim 1 wherein said catalyst is a Friedel-Crafts catalyst.

* * * * *